(12) United States Patent
Freed et al.

(10) Patent No.: US 9,405,918 B2
(45) Date of Patent: *Aug. 2, 2016

(54) VIEWER-BASED DEVICE CONTROL

(71) Applicant: Amazon Technologies, Inc., Reno, NV (US)

(72) Inventors: Ian W. Freed, Seattle, WA (US); Gregory M. Hart, Mercer Island, WA (US); Jeffrey P. Bezos, Greater Seattle Area, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,054

(22) Filed: Dec. 29, 2014

(65) Prior Publication Data

US 2015/0116212 A1 Apr. 30, 2015

Related U.S. Application Data

(63) Continuation of application No. 12/763,115, filed on Apr. 19, 2010, now Pat. No. 8,922,480, which is a continuation-in-part of application No. 12/718,788, filed on Mar. 5, 2010, now Pat. No. 8,913,004.

(51) Int. Cl.
| | |
|---|---|
| *G09G 5/00* | (2006.01) |
| *G06F 21/60* | (2013.01) |
| *G06F 3/01* | (2006.01) |
| *G06F 21/10* | (2013.01) |

(Continued)

(52) U.S. Cl.
CPC ............... *G06F 21/60* (2013.01); *G06F 3/013* (2013.01); *G06F 21/10* (2013.01); *G06F 21/6245* (2013.01); *G06F 21/82* (2013.01); *G09G 5/00* (2013.01); *G09G 3/003* (2013.01); *G09G 2320/068* (2013.01); *G09G 2320/08* (2013.01); *G09G 2340/0407* (2013.01); *G09G 2354/00* (2013.01); *G09G 2358/00* (2013.01)

(58) Field of Classification Search
CPC ....... G06F 3/013; G06F 1/3231; G06F 21/60; G06F 21/10; G06F 21/6245; G06F 21/82; G09G 5/00; G09G 3/003; G09G 2320/08; G09G 2340/0407; G09G 2354/00; G09G 2358/00

See application file for complete search history.

(56) References Cited

U.S. PATENT DOCUMENTS

| | | |
|---|---|---|
| 5,808,705 A | 9/1998 | Hishida et al. |
| 6,120,026 A | 9/2000 | Whitney et al. |

(Continued)

OTHER PUBLICATIONS

"Non-Final Office Action dated Jul. 8, 2013," U.S. Appl. No. 12/763,115, 16 pages.

(Continued)

*Primary Examiner* — Lun-Yi Lao
*Assistant Examiner* — Peter D McLoone
(74) *Attorney, Agent, or Firm* — Polsinelli LLP

(57) ABSTRACT

A computing device can monitor the gaze direction of people around the device to determine whether any unintended viewers are viewing content displayed on the device. A user can activate a privacy mode of the device, such that when an unintended viewer is detected the device can take an appropriate action. In some cases the device can notify the primary user of the device using audible, visual, or tactile alerts. In other cases, the device can modify the display of content such that the unintended viewer is unable to decipher or view the content, or is otherwise notified of the detection.

20 Claims, 12 Drawing Sheets

(51) Int. Cl.
*G06F 21/62* (2013.01)
*G06F 21/82* (2013.01)
*G09G 3/00* (2006.01)

(56) References Cited

U.S. PATENT DOCUMENTS

| | | | |
|---|---|---|---|
| 6,262,843 B1 | 7/2001 | Marx | |
| 6,765,550 B2 | 7/2004 | Janick et al. | |
| 7,036,025 B2 | 4/2006 | Hunter | |
| 7,379,560 B2 | 5/2008 | Bradski et al. | |
| 7,460,150 B1 | 12/2008 | Coughlan et al. | |
| 7,774,851 B2 | 8/2010 | Singh et al. | |
| 7,861,089 B2 | 12/2010 | Tomita | |
| 8,141,159 B2 | 3/2012 | Peled et al. | |
| 8,225,229 B2 | 7/2012 | Thorn et al. | |
| 8,325,020 B2 | 12/2012 | Izadi et al. | |
| 8,447,070 B1 | 5/2013 | Bozarth et al. | |
| 8,462,949 B2 | 6/2013 | Anderson et al. | |
| 8,913,004 B1 | 12/2014 | Bozarth et al. | |
| 8,922,480 B1 | 12/2014 | Freed et al. | |
| 9,274,744 B2 * | 3/2016 | Hart | G06F 1/1626 |
| 2002/0113782 A1 | 8/2002 | Verberne et al. | |
| 2002/0158967 A1 | 10/2002 | Janick et al. | |
| 2003/0085870 A1 | 5/2003 | Hinckley | |
| 2004/0175020 A1 | 9/2004 | Bradski et al. | |
| 2005/0057491 A1 | 3/2005 | Zacks et al. | |
| 2005/0066165 A1 | 3/2005 | Peled et al. | |
| 2006/0087502 A1 | 4/2006 | Karidis et al. | |
| 2006/0192775 A1 | 8/2006 | Nicholson et al. | |
| 2006/0210167 A1 | 9/2006 | Inoue et al. | |
| 2007/0150827 A1 | 6/2007 | Singh et al. | |
| 2007/0198286 A1 | 8/2007 | Tomita | |
| 2007/0247524 A1 | 10/2007 | Yoshinaga et al. | |
| 2008/0111833 A1 | 5/2008 | Thorn et al. | |
| 2009/0141895 A1 | 6/2009 | Anderson et al. | |
| 2009/0273562 A1 | 11/2009 | Baliga et al. | |
| 2010/0079508 A1 | 4/2010 | Hodge et al. | |
| 2010/0205667 A1 | 8/2010 | Anderson et al. | |
| 2011/0121950 A1 | 5/2011 | Izadi et al. | |
| 2011/0241983 A1 | 10/2011 | Chang | |
| 2012/0062729 A1 | 3/2012 | Hart et al. | |
| 2013/0174273 A1 | 7/2013 | Grab et al. | |
| 2014/0285435 A1 * | 9/2014 | Bezos | 345/156 |
| 2015/0169053 A1 * | 6/2015 | Bozarth et al. | 345/156 |
| 2015/0234457 A1 * | 8/2015 | Kempinski | G06K 9/00604 |
| | | | 345/156 |

OTHER PUBLICATIONS

"Final Office Action dated Oct. 24, 2013," U.S. Appl. No. 12/763,115, 16 pages.
"Non-Final Office Action dated Apr. 8, 2014," U.S. Appl. No. 12/763,115, 20 pages.
"Notice of Allowance dated Sep. 10, 2014," U.S. Appl. No. 12/763,115, 9 pages.
"Non-Final Office Action dated Jun. 28, 2012," U.S. Appl. No. 12/718,788, 14 pages.
"Final Office Action dated Dec. 10, 2012," U.S. Appl. No. 12/718,788, 16 pages.
"Non-Final Office Action dated Mar. 12, 2014," U.S. Appl. No. 12/718,788, 16 pages.
"Notice of Allowance dated Aug. 27, 2014," U.S. Appl. No. 12/718,788, 16 pages.

* cited by examiner

VIEWER-BASED DEVICE CONTROL

CROSS-REFERENCES TO RELATED APPLICATIONS

This application is a continuation of U.S. patent application Ser. No. 12/763,115, filed on Apr. 19, 2010 (20346.0084.NPUS00), which is a continuation-in-part of U.S. patent application Ser. No. 12/718,788, filed on Mar. 5, 2010 (20346.0078.NPUS00) of which the full disclosure of these applications are incorporated herein by reference for all purposes.

BACKGROUND

As the variety of available computing devices increases, and as the size of many of these devices decreases, people are increasingly utilizing portable devices such as cellular phones, personal digital assistants (PDAs) and other electronic devices to access information and perform an ever-increasing variety of tasks. In many cases, the information being accessed by a user of a computing device, and thus displayed on a display screen or other component of the computing device, includes sensitive information that the user would prefer not to be exposed to others nearby. For example, a user might access financial account information or personal health data and prefer that such information be kept private.

Even when the information is not necessarily sensitive or confidential, certain users prefer not to have others nearby "looking over their shoulder" viewing information or content being displayed on the computing device. For example, a user viewing a movie on a plane might not be able to enjoy the movie if the person in the next seat is also watching the movie. Certain conventional approaches, such as privacy screens, address at least some of these situations, but privacy screens are fixed and do not allow users to view content from different angles without removing the screen each time. Further, the clarity of the image can be affected by the screen even when there is no one else around to view the displayed content. For a user of a notebook or similar computing device on a plane, for example, the need to remove and store a screen-size filter can be a nuisance at the least.

BRIEF DESCRIPTION OF THE DRAWINGS

Various embodiments in accordance with the present disclosure will be described with reference to the drawings, in which.

DETAILED DESCRIPTION

Figure 1:
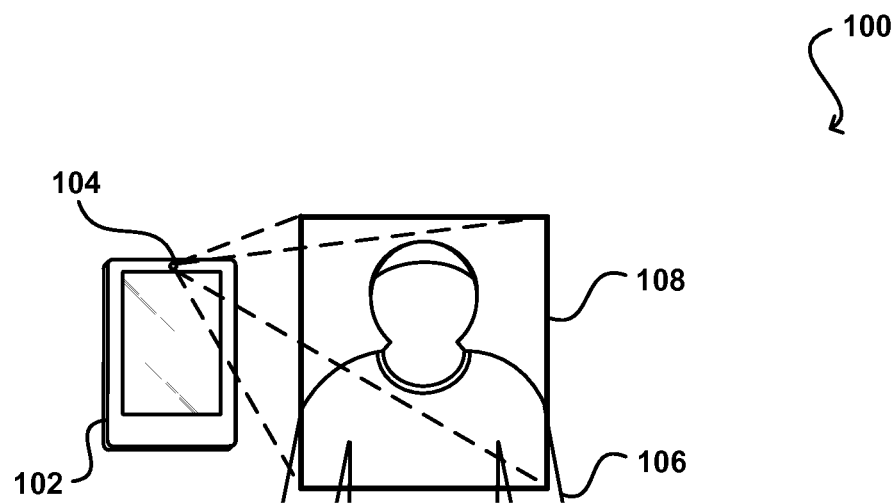
FIG. 1 illustrates an example of a portable device including an element operable to image the facial region of a user in accordance with one embodiment.

Systems and methods in accordance with various embodiments overcome many of the aforementioned and other deficiencies experienced in conventional approaches to managing the viewing of content on electronic devices. In one embodiment, at least one imaging element captures an image of any potential viewer (e.g., human) within a viewing range of a computing device and attempts to determine a direction in which each viewer is looking relative to the device (referred to herein as a "gaze direction"). The determined gaze direction of each viewer, including the primary viewer of the device and any secondary viewer, can be used as input to control various aspects of the device, such as how and whether certain content is displayed on the device. For example, if it is determined that a secondary viewer's gaze direction is toward the device, the display element may shut off, or the content rendered via the display element can be modified to prevent the secondary viewer from viewing the content.

In various embodiments, a computing device can include at least one display element. Viewers of the computing device will typically be facing the display element of the computing device during use, at least for specific applications or uses. Specifically, the primary viewer, which may also be referred to herein as the user, will generally be centered with respect to the display element of the computing device, and any secondary viewers will be angularly displaced from the center of the display element. The computing device can include, or be in communication with, at least one imaging element, such as a camera, detector or sensor, that can be positioned with respect to the device such that the imaging element is able to obtain images of at least a portion of each viewer viewing content displayed via the device. In one embodiment, a high speed, high resolution camera capable of capturing a large number of images in a small amount of time is utilized. The device can analyze image information obtained from the imaging element and determine at least one relative location or orientation of each viewer with respect to the device, as well as a gaze direction or field of view of each viewer. The image processing algorithm can also determine a change in gaze direction of each viewer with respect to the device.

In some embodiments, an imaging element of the computing device can include at least one infrared emitter and at least one infrared detector that can be positioned with respect to the device such that the device is able to obtain images of infrared radiation reflected from each viewer's eyes (as long as the viewer is within a particular area of detection). The device can analyze image information relating to the relative size, separation and position of a viewer's pupils, for example, and can determine a gaze direction or field of view of each viewer with respect to the device. In one embodiment, continuous or periodic infrared illumination is utilized to monitor changes in viewer gaze direction with respect to the device.

In various embodiments, an image processing algorithm is used to determine and monitor gaze direction relative to the device in a series of obtained images and determine/identify the relative position and/or field of view of each viewer's eyes with respect to the display element and/or imaging element. Based on the determined gaze direction and/or field of view of the viewer's eyes with respect to the display element and/or imaging element, the algorithm can determine at least whether each viewer is looking substantially at, or away from, the display element. In another embodiment, the algorithm may further determine, based on the gaze direction and the field of view of the viewer's eyes with respect to the display element and/or imaging element, where each viewer is looking with respect to the display element, such as at a particular icon or even focused about a particular pixel or other display element. By tracking changes in the field of view/relative position of the viewer's eyes, the algorithm can determine at any time whether the viewer is looking at the device and, if so, where on the device each viewer is looking.

In addition to tracking gaze direction and field of view, in some embodiments facial recognition may be utilized to identify users of the device. A primary user may become associated with the device, and when that user is recognized, the device may perform certain actions in response. For example, particular applications may be enabled or launched upon recognizing a particular user, or certain actions may be performed if the registered user is not detected (such as shutting off the device). In addition to facial recognition, audio may also be used to confirm a user's identity. If the device attempts to utilize facial recognition but cannot reach a high enough level of confidence, it may ask the user to provide an audio sample that can be analyzed to supplement verification.

A user can select between different modes of operation in some embodiments, including a first mode that enables any viewer to view content on the device and a second mode (a "privacy mode") that limits viewing to the primary viewer and prevents (or limits) secondary viewers from viewing content displayed on the device. Upon detecting a secondary viewer while in privacy mode, a computing device in some embodiments will notify a primary user of the device that another person is viewing content displayed on the device. The notification can be audible, visual or provided via tactile feedback or by other techniques. In other embodiments, the secondary viewer can be notified that the information is not intended to be viewed by the secondary viewer.

In some embodiments, a device that is in privacy mode and that detects a secondary viewer can modify the content displayed via the device. For example, the image can be blurred, rotated, animated, flipped or otherwise modified such that the secondary user will not be able to decipher the information. In some cases, a pop-up screen or other element might be displayed that blocks the sensitive content. In some cases, polarization patterns or three-dimensional interfaces can be used and/or activated that prevent unauthorized viewers at substantially non-direct viewing angles from viewing the content (or at least a focused or clear version of the content). In some embodiments, the display element can have different brightness values, or even shut off, based at least in part upon where and/or for how long the secondary viewer is looking at the display element and/or the device.

In some embodiments, a computing device can also determine whether the secondary viewer is looking at an input mechanism of the device, such as a keyboard or keypad. The computing device can notify a primary user of the device such that the primary user can be alerted to not key in sensitive information, such as a password or PIN number, as a secondary viewer might be watching the information actually being entered, even when the information is not viewable via the display element.

In some embodiments, the device can include touch-sensitive elements, over at least a portion of the device, such that the device can determine whether a user is currently holding the device. In such embodiments, the device can function differently if the user is holding the device versus whether the device is on a table, etc., and a secondary viewer is detected to be looking toward the device.

As discussed, many of the actions of a user with respect to a device can be detected using an image-based approach, which is able to determine a gaze direction, or field of view, of a user with respect to the device. FIG. 1 illustrates a configuration 100 in accordance with one embodiment wherein at least a portion of a user 106 operating a portable computing device 102 is imaged by an imaging element 104 associated with the portable device 102. It should be understood that the relative orientation of the user and the device shown in the figure is shifted for purposes of explanation, and that the user generally faces a side (e.g., front, back, or other side) of the device that includes a display element and the imaging element 104. The imaging element 104 may be, for example, a camera, a charge-coupled device (CCD), a motion detection sensor or an infrared sensor, among many other possibilities. It should also be understood that, while a portable computing device 102 is depicted in this example, the portable device could be any appropriate device able to receive and process input commands, such as a personal computer, laptop computer, notebook, netbook, television set top box, cellular phone, PDA, electronic book reading device, video game system or portable media player, among others.

In other embodiments, the imaging element alone or in combination with one or more of the computing components discussed herein that are used to process the images and determine gaze direction may be separable from the computing device and/or the display element. For example, the imaging element and the processing components for analyzing the obtained images may be housed in an external case that is removably attachable to the portable computing device 102. In such an embodiment, the external case may be connected to and in communication with the portable computing device 102 or only in communication with the portable computing device 102.

In the configuration illustrated in FIG. 1, the imaging element 104 is on the same general side of the portable device 102 as a display element such that when a user is viewing information in the display element, the imaging element has a viewable area 108 that, according to this example, includes the face of the user 106. While in some embodiments the imaging element is fixed relative to the device, in other embodiments the imaging element can be operable to track the position of the user, such as by rotating the imaging element or an optical element (e.g., lens, mirror, etc.) that directs the signal to the imaging element. Although embodiments described herein use examples of the viewable area that include the face of the user, the viewable area may include other portions of the body such as arms, legs and hips, among other possibilities. In either case, the viewable area 108 of the imaging element can be configured to obtain image information corresponding to at least a portion of a user operating the device. If the imaging element is continually (or at least substantially continually) capturing or otherwise obtaining image information, then any movement of the user 106 relative to the device 102 (through movement of the user, the device or a combination thereof) can cause a position or orientation of at least one aspect of that user (e.g., face or eye location) within the viewable area 108 to change. If the device includes software and/or hardware that is able to locate at least one such feature of the user that can be consistently determined, then the device can analyze the image information to manage functionality of the device over a period of time and utilize that relative motion as a source of input.

Figure 2:
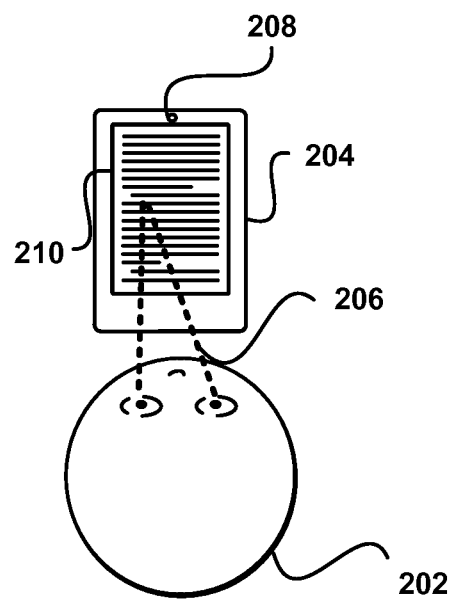
FIG. 2 illustrates an example of a gaze direction of a primary user with respect to a portable computing device as can be detected by an element operable to image the facial region of a user in accordance with one embodiment.

For example, a portable computing device 204 such as that illustrated in FIG. 2 can determine an approximate gaze direction 206 and/or gaze position of one or more users 202 (or viewers) with respect to the device. In this example, the user 202 is glancing at information displayed on a display element 210 of the device 204. An imaging element 208 of the device can capture at least one image of a user to determine the approximate gaze direction of the user, such as by using one or more image analysis algorithms as discussed elsewhere herein. The device can track changes in gaze direction using the imaging element (e.g., camera), as the position of the user's eyes in subsequently captured images (e.g., corresponding to the viewable area) move or are no longer contained within the area of the captured images. In addition to gaze direction, aspects such as the imaged shape, size and separation of the user's eyes can also be determined and monitored, as discussed elsewhere herein, which can provide information such as relative distance, identity or physical characteristics of the user.

A change in eye position in the viewable area could also be accomplished by moving the device up and down while the user remains still, as well as through other such motions. In some embodiments, the device can distinguish between movement of the user and movement of the device by detecting movement of a background or other aspect of the images or by analyzing the separation, shape or size of various features. Thus, in embodiments described anywhere in this description that use the imaging element to determine an orientation of the device relative to its user, the tracking of information such as gaze direction can account for movement of the device, such that a change in gaze direction due to movement of the device relative to the user can be accounted for without inadvertently registering the change in gaze direction as a new input value. Other movement and orientation determining elements can be used as well as discussed elsewhere herein.

In addition to being able to determine and track the gaze direction of a primary user of a computing device, a computing device can also be configured to detect the gaze direction of additional viewers of content displayed on, or otherwise presented by, the computing device. For example, FIG. 3(*a*) illustrates a configuration 300 wherein a primary user 302 is viewing content on a computing device 304. The computing device 304 includes an image capture element 310 with an angular field of view 308, an extent of which can be determined at least in part upon the type of lens used with the image capture element (e.g., a wide angle lens for a larger angular field of view). In this example, another viewer 306 is within the angular field of view of the image capture element 310. If the viewer 306 is looking at least partially towards the device, such that the eyes of the viewer appear in at least one image captured by the image capture element, the computing device (or a remote system or service) can determine the gaze direction of the additional viewer 306, at least with respect to the computing device.

In certain situations, the primary user 302 might not care that the secondary viewer 306 is also viewing the content displayed on the computing device, and in certain situations (e.g., playing games or viewing movies) the primary user might even encourage the secondary user to also view the content. In certain situations (e.g., accessing financial or other confidential or sensitive information), however, the primary user might not want the secondary viewer to be able to view the content displayed on the computing device. FIG. 3(*b*) illustrates an approach that can be used in accordance with various embodiments, wherein a secondary viewer 306 is within an angular field of view 308 of an imaging element 310 of a computing device 304. In such an embodiment, at least a portion of the secondary viewer 306 can be contained in at least one image captured by the computing device. Based at least in part upon the captured image, an algorithm executing on the computing device (or on a remote system in communication with the computing device) can determine whether the user is looking in a direction that substantially corresponds with a display element of the portable computing device. If a privacy module or other such component or module of the computing device 304 determines that a gaze direction of the secondary viewer is substantially toward a display element of the computing device 304, the module can trigger one or more actions to limit or substantially prevent the secondary viewer from viewing content displayed on the computing device.

In one embodiment, a privacy module can determine the type of content being viewed and/or the context in which the content is being viewed. For example, the device might determine whether the device is connected to a home network of the user or connected to a public wireless network. If the primary user is viewing sensitive information while at home, the device might not enter into a privacy mode. If the primary user is connected to a public wireless network, the device might always notify the primary user when another person is viewing content on the device. If the user is playing bills at home, the device might not apply privacy settings, but if the user is determined to be at work, the device might blank the screen any time anyone else is detected to be looking at the screen. In some cases, the device can use facial recognition or another such process to identify secondary viewers and make viewer-specific determinations as to whether to block content. For example, certain content might be blocked if an unknown, known but unauthorized, or person is a particular age is looking at the screen. For example, if a parent is shopping for birthday presents and a child enters the room, the device may block the content upon detecting the gaze direction (or the presence) of the child. Various other combinations can be used as well as should be apparent.

Figure 3A:
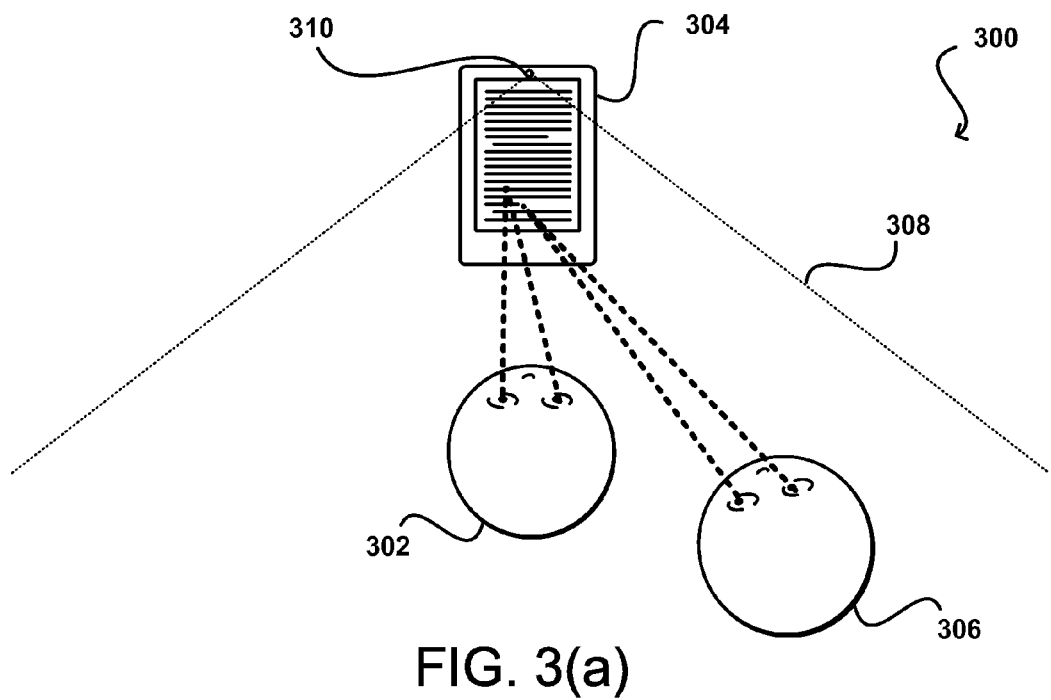
FIGS. 3(a)-(b) illustrate an example situation wherein a secondary viewer is detected to be gazing in a direction of the portable computing device in accordance with one embodiment.
Figure 3B:
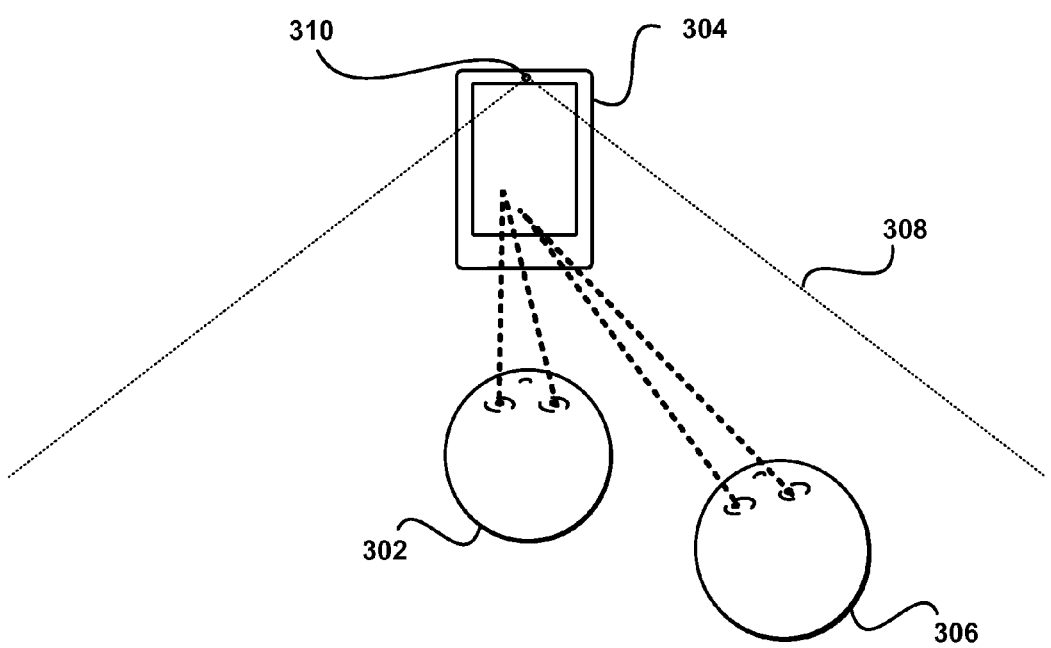

In the example of FIG. 3(a), the computing device 304 is configured to dim, shut off or otherwise modify an aspect of the display screen when at least one secondary viewer is determined to be viewing (or likely to be viewing) the display screen. The action taken can, in at least some embodiments, be configurable by the user of the computing device. In this particular embodiment, the display screen turns off temporarily when another viewer 306 is determined to be glancing at the display element. Since such action can be somewhat annoying to the primary user, and since the user in some embodiments will want other viewers to see the content displayed on the screen at certain times, the computing device can have different modes of operation or other settings that allow the user to specify whether to turn off the screen or to take another action when another viewer is detected viewing the display element.

The user also can configure the mode to be active for certain applications or uses. For example, a user might not want to have to manually turn on a "privacy mode" each time the user accesses a banking application, personal email or other sensitive information. In some embodiments, the user can specify one or more settings that cause privacy mode to be activated for certain applications or uses. For example, a user can select specific applications from a list to be associated with the privacy mode, whereby privacy mode is automatically activated each time the user accesses the selected applications. The device can also be configured to exit privacy mode each time the user closes one of those applications or brings another interface or element to a primary view, wherein the sensitive information is no longer displayed or otherwise viewable by secondary viewers. For example, the user may configure the privacy mode to be active if the user accesses any of a list of URLs for bank, health or legal sites. The privacy mode may also be configured to be active if selected websites are accessed while the device is not at defined location(s) (e.g., accessing banking information away from home).

In addition to blanking or dimming the screen, the computing device can take any of a number of other actions when another viewer, also referred to herein as a secondary viewer, is detected. For example, the user might not want the display to be affected because the action can prevent the user from properly viewing the content for a period of time. In some embodiments, the computing device can instead activate a tactile feedback element to cause the device to vibrate when another viewer is viewing the display element. In other embodiments, the computing device can emit a sound, such as a digital bell or other audible notification, when another viewer is detected. In some embodiments, the user might want to be discrete, in order to not offend the detected viewer, and might specify settings that emit sounds only if headphones are plugged into the device and otherwise cause the device to vibrate. In some embodiments, the device can determine whether the user is holding the device, such as by using orientation determining elements or touch-sensitive materials, and can cause the device to vibrate only when being held by a user. Various other settings and variations are possible in accordance with the various embodiments.

Figure 4:
FIG. 4 illustrates an example interface indicating to a primary user that a secondary viewer has been detected in accordance with one embodiment.

In some embodiments, the content displayed via the display element of the computing device can be altered or updated in order to notify the user and/or viewer of the detected viewing. For example, FIG. 4 illustrates an interface display 400 that informs the primary user that another viewer is determined to be viewing the content. In this example, a first icon 404 can be displayed, illuminated, rendered in color, animated or otherwise altered to indicate to a user that another viewer is detected to be viewing the content on the display. The interface also (or alternatively) can display a moveable icon 402 or other graphical element that indicates to the user substantially where the detected viewer is determined to be looking. The moving icon 402 can serve multiple purposes, as the icon not only alerts the user to the information being viewed by another viewer, but also can at least partially mask the information being viewed by the detected viewer, such that some of the information will be protected and the user will be less likely to continue reading or viewing information if the icon keeps moving to where the viewer is looking.

Figure 5:
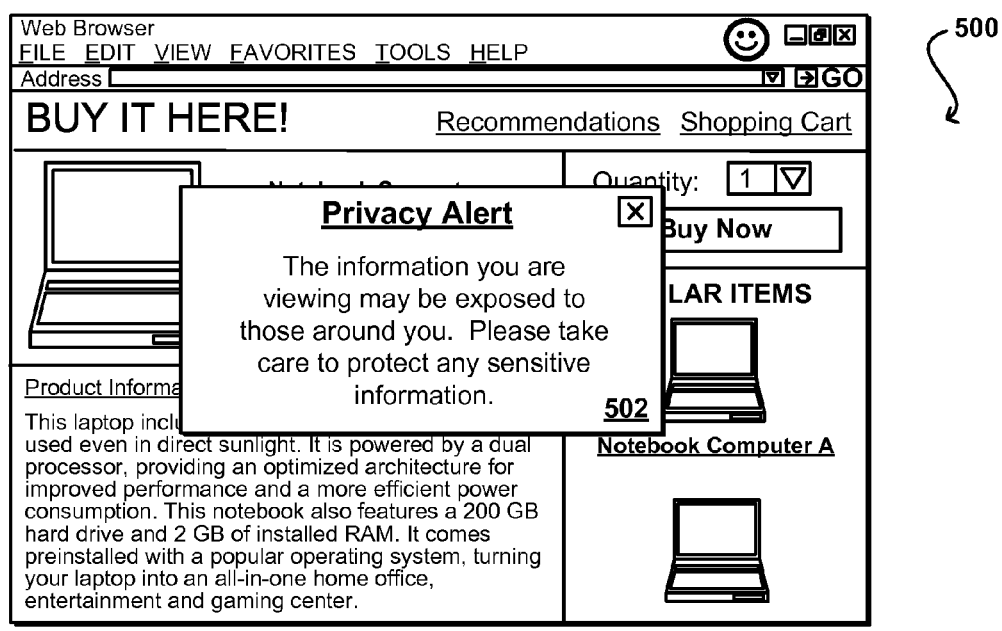
FIG. 5 illustrates an example interface indicating to a primary user that a secondary viewer has been detected in accordance with one embodiment.

FIG. 5 illustrates an approach in accordance with another embodiment, wherein the interface 500 generates an alert, warning or other notification 502 that another viewer is viewing the information displayed on the device. The type of alert and content of the alert can vary between embodiments and, in at least some cases, can be configurable by the user. In this example, the alert comprises a popup window, modal window or other such element that indicates that the currently displayed information might be exposed to other viewers. Such an alert can have the benefit of not only alerting the user, but can also likely cause the detected viewer to stop viewing the information. The wording of the alert can be selected in such a way as to not offend the detected viewer, where possible. In some embodiments the user must close the alert, while in other embodiments the alert will disappear when the secondary viewer is no longer looking at the display or at some point in time (e.g., three seconds) after the viewer is no longer looking at the display.

Figure 6:
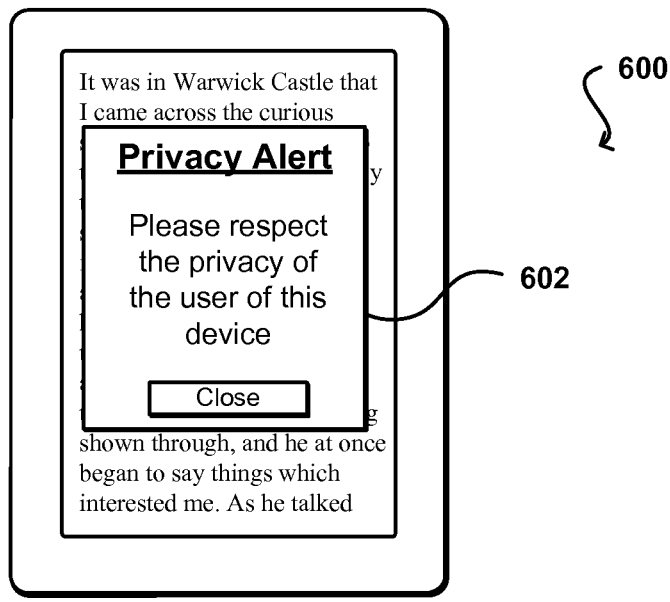
FIG. 6 illustrates an example interface indicating to a secondary user that the secondary viewer has been detected in accordance with one embodiment.

FIG. 6 illustrates an example of a notification 602 that can be displayed on an interface 600 that is not primarily directed to alerting the user of the device, but to notifying the detected viewer that the viewer has been detected to be looking at the display. In this case, the notification can include any appropriate information requesting that the viewer not continue looking at the display. As should be apparent, the notification can be accompanied (or replaced) by audio alerts, electronic voice requests, animations or any other appropriate information or action directed at a detected viewer.

Figure 7:
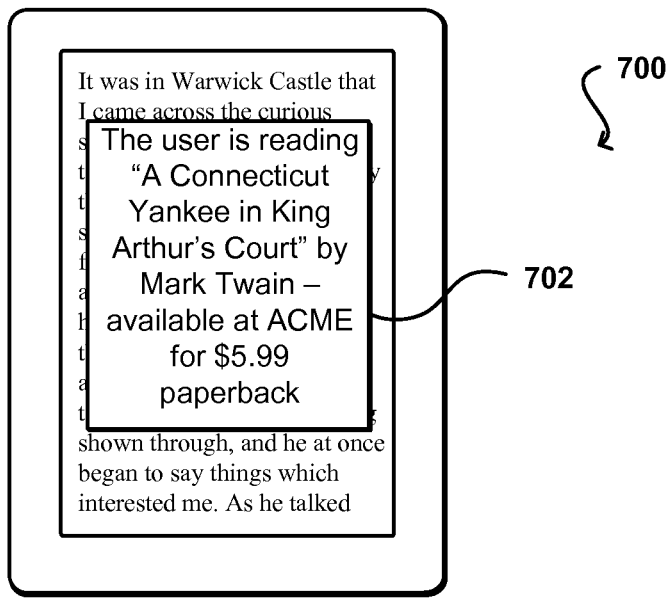
FIG. 7 illustrates an example interface providing advertising viewable by a secondary viewer who has been detected in accordance with one embodiment.

In some cases, the user of the device might not want to be quite as blunt as to ask the viewer to no longer view the display on the computing device. In other cases, the provider of content being displayed on the device might want some control over the viewers of the content, such as where a single license was purchased for the content being displayed. FIG. 7 illustrates an approach that can be taken with another example interface 700, wherein information 702 about the content (e.g., advertising information or information about obtaining a copy of the information) is displayed when another viewer is detected viewing the display. If a secondary viewer is reading something of interest over a user's shoulder, the viewer can obtain information useful in obtaining that content of interest. Further, if the user and viewer are attempting to both view content where only one has been granted access, the content can be at least partially hidden, stopped, paused or otherwise modified such that the content can only be viewed by one viewer (e.g., the primary user). In some cases, the device can use facial recognition or another such process to further prevent viewers other than the primary user from viewing the device. Such an approach can be useful in situations such as testing, for example, wherein only the person taking that instance of the test is able to view the information, and other viewers will be substantially prevented from copying answers or collaborating on the test. Further, content such as downloaded movies or streaming content can be more tightly controlled such that the viewing of the content complies with the terms of agreement for the content.

Figure 8:
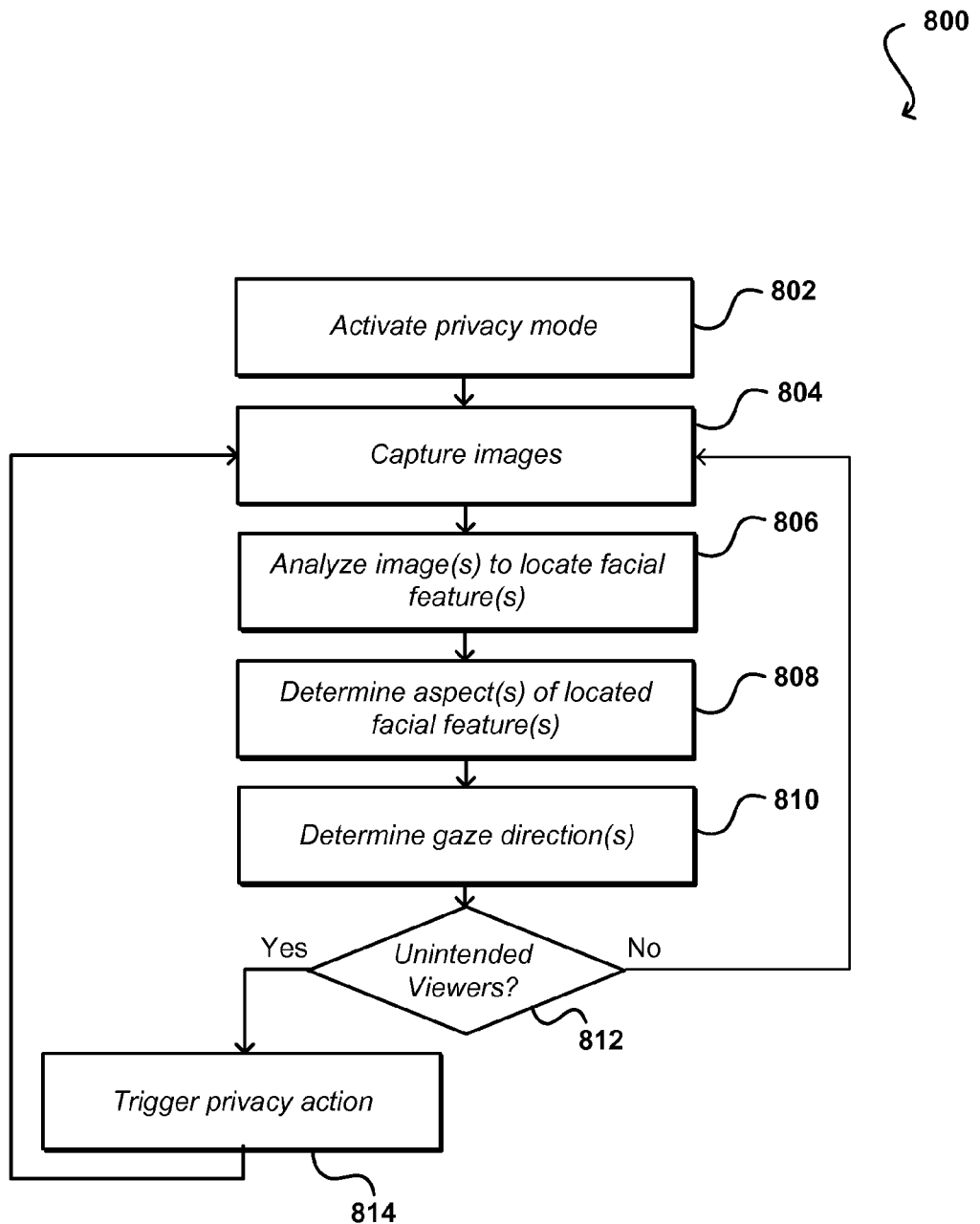
FIG. 8 illustrates an example process for triggering a privacy action in response to a detected secondary viewer that can be used in accordance with various embodiments.

FIG. 8 illustrates an example of a process 800 that can be used to trigger a privacy (or similar) action on a computing device when at least one unintended viewer is detected in accordance with various embodiments. In this process, a privacy mode (or similar mode) of the device is activated 802 using approaches such as those discussed herein. In some instances this might occur automatically at startup, or upon opening of a specified application or source of content, and in other instances this might require first receiving an activation request on behalf of the user. An imaging element of the device obtains image information corresponding to the viewable area of the imaging element 804, and the images are analyzed to locate at least one desired facial feature of each viewer detected within a viewable area of the imaging element 806. In some cases, this process might require analyzing one or more images, or a stream of images, to locate features such as the eyes of each viewer. Once appropriate facial features of each viewer are located within an acceptable degree of certainty, various aspects of those facial features are determined 808. For example, if the features include a viewer's eyes, an algorithm can determine the dimensions of each eye, the separation, the relative position with respect to the face, distance from the nose or other such aspects, such that a change in orientation can be detected. In other embodiments, this can further include information such as dimensions of the viewer's pupils and relative positions with respect to the eye positions, such that a change in gaze direction can be determined. Based at least on the determined aspects, an initial gaze direction or view location of each viewer with respect to the device is determined 810. In some embodiments, a device might require a primary user to face the device during an initial calibration or startup period, and that user can be tracked in order to determine whether a current viewer is the primary user. In other devices, such as where user information is stored, the device can capture a single image and analyze the information to determine a relative orientation by comparing measured aspects from the image with stored aspect information for the user. Further, orientation information from an orientation detection element such as an accelerometer can also be used to make determinations as to user gaze direction or other such aspects.

Once the gaze direction for each detected user is obtained, a determination can be made as to whether there are any unintended viewers currently viewing content displayed on the device 812, although in some embodiments this can also include unintended viewers of other portions of the device, such as a viewer watching a user type on a keypad or providing other such input. As discussed, the determination of unintended viewers can depend at least in part upon whether the user specified that additional viewers are to be treated as unintended viewers, as well as how many viewers (e.g., any besides the primary user) should be allowed to view the content. If there are no unintended viewers, the device can continue monitoring the area around the device using the imaging element. If there is at least one unintended viewer, at least one privacy action can be triggered 814. The privacy action can include any appropriate action discussed herein, such as blanking the screen temporarily, providing an alert or notification, etc. The device can continue imaging to detect when the viewer looks away, as well as whether the viewer (or another viewer) subsequently looks at the device. As should be understood, this process and other processes discussed herein can have additional, fewer, or alternative steps performed in similar or alternative orders, or in parallel, within the scope of the various embodiments unless otherwise stated.

Figure 9:
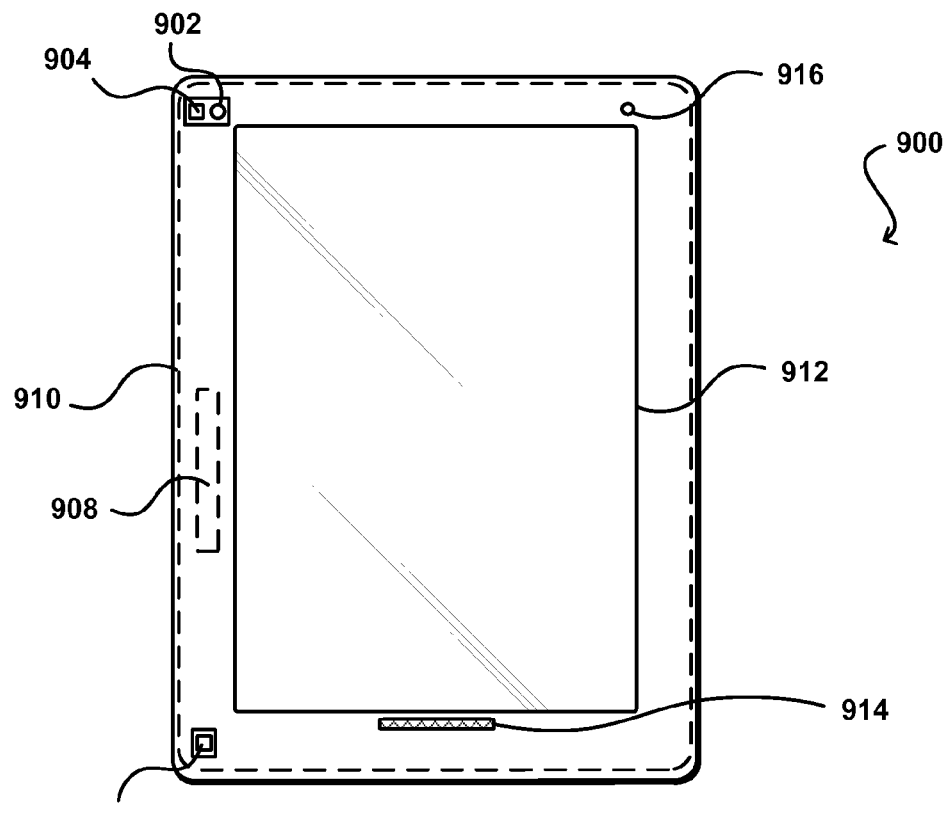
FIG. 9 illustrates an example computing device that can be used in accordance with various embodiments.

FIG. 9 illustrates an example of an electronic computing device 900 that can be used in accordance with various embodiments. This example includes a display element 912 and an orientation-determining element 908, such as an accelerometer, which can be used to help interpret motion in a captured image using various approaches described herein. As discussed, the device also includes an image capture element for capturing image information about the user of the device. While the device in FIG. 1 included a camera for capturing full-color images, for example, this example device includes an IR emitter 902 and two IR detectors 904, 906 (although a single detector and two emitters could be used as well within the scope of the various embodiments). In this example, a first IR detector 904 is positioned substantially adjacent to the IR emitter 902 such that the first IR detector will be able to capture the reflected infrared radiation from a viewer's retinas. The second IR detector 906 is positioned a distance away from the IR emitter 902 such that the detector will not detect any reflected radiation due to the IR emitter. The emitter and detectors can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the user's gaze.

As discussed, using multiple input mechanisms can help to interpret information captured about each viewer, such as the movement of a viewer's pupils or other features. For example, the device can include a touch-sensitive element 910 around at least a portion of the device 900. A material similar to that used with a touch-sensitive display element can be used on the back and/or sides of the device. Using such material, the device is able to determine whether a user is actively holding the device in addition to whether the user is looking at, or away from, the device. Such information could be used with the gaze information to determine how to adjust the display element in the event of an unintended viewer. For example, in some embodiments, the display element might be configured to go into a mode with lower contrast or brightness when the user is holding the device, and might be configured to turn completely off if the user is not holding the device and an unintended viewer is detected.

In addition to determining whether the user is holding the device, through use of the touch-sensitive element, the system can determine what portions of the device are held/covered by the user. In such an embodiment, multiple IR emitters may be positioned on the device at different locations, and based on where the user is holding the device (i.e., which IR emitters are covered vs. not covered), the system can determine which IR emitters to use when capturing images.

The example device in FIG. 9 also includes a light-detecting element 916 that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear) and privacy detection to be temporarily disabled. The light-detecting element could be used in conjunction with information from other elements to adjust the functionality of the device.

Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes, the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The example device 900 in FIG. 9 is shown to also include a microphone 914 or other such audio-capturing device. The device in at least some embodiments can also determine various actions based upon sound detected by the microphone. For example, a user can provide audio comments to activate programs or enable/disable privacy functions. In other embodiments, the device might be able to determine from the detected sound whether there are other people near the device, which can cause the device to activate a privacy mode. If the device is in a pocket or bag, for example, the microphone might be significantly covered by a material, which can affect the quality of sound recorded. In some embodiments, the device might emit (periodically or continually) a sound that is not perceptible to humans, but that can be detected by the device. In this way, the device can determine whether it is likely in a location that cannot readily be viewed by an unintended viewer, such that privacy mode can be disabled.

Figure 10:
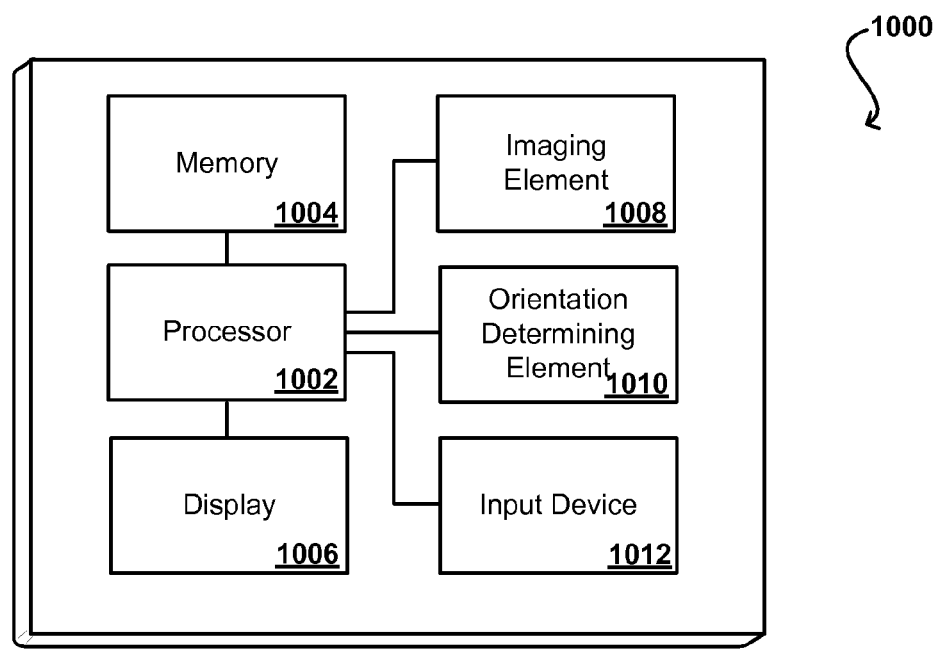
FIG. 10 illustrates components of a computing device that can be used in accordance with various embodiments.

FIG. 10 illustrates a set of basic components of an example computing device 1000 such as the devices described with respect to FIGS. 1 and 9. In this example, the device includes a processor 1002 for executing instructions that can be stored in a memory device or element 1004. As known in the art, the device can include many types of memory, data storage or computer-readable media, such as a first data storage for program instructions for execution by the processor 1002, a separate storage for images or data, a removable memory for sharing information with other devices, etc. The device will typically include some type of display element 1006, such as a liquid crystal display (LCD), although devices such as portable media players might convey information via other means, such as through audio speakers. As discussed, the device in many embodiments will include at least one imaging element 1008 such as a camera that is able to image a facial region of a user. The imaging element can include any appropriate technology, such as a charge coupled device (CCD) imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can have sufficient processing capability, and the imaging element and associated analytical algorithm(s) may be sensitive enough, to distinguish between the motion of the device, motion of a user's head, motion of a user's eyes and other such motions based on the captured images alone. In other embodiments, such as where it may be desirable for the process to utilize a fairly simple imaging element and analysis approach, it can be desirable to include at least one orientation determining element 1010 that is able to determine a current orientation of the device 1000. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

In some embodiments, the device can include at least one additional input device 1012 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices can also include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

Figure 11:
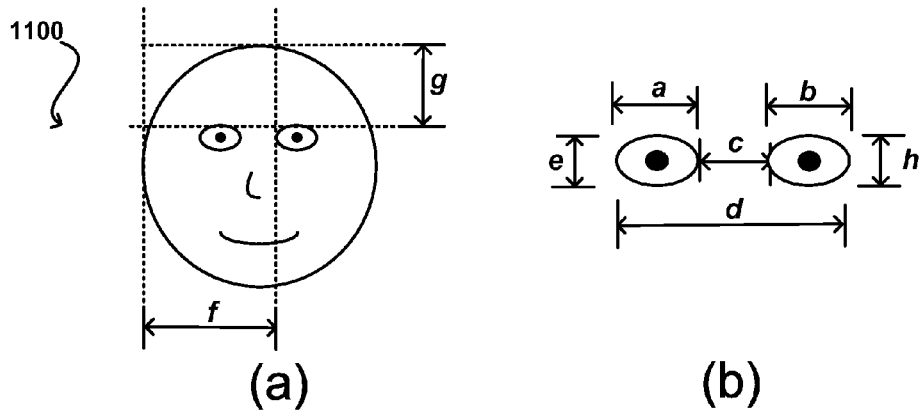
FIGS. 11(a)-(b) illustrate analysis of facial features of a user in accordance with various embodiments.

Algorithms for determining the gaze direction of a user with respect to the computing device can use any number of different approaches. For example, FIG. 11(a) illustrates an image of a face 1100 of a user of a device as could be captured (e.g., obtained, imaged) by an imaging element of the device. Thus, the face 1100 is depicted as perceived by the imaging element of the device. As can be seen in FIG. 11(a), and also in the eye-specific view of FIG. 11(b), there are various aspects of the user's face that can be located and measured, such as the perceived width and height of a user's eyes, the perceived relative separation of a user's eyes and the perceived relative position of the user's eyes to an edge of the user's face when facing the device. Any number of other such measurements or aspects can be used as should be apparent. When a user tilts or translates the device, or moves his or her head in any direction, there will be a corresponding change in at least one of these measured aspects in subsequent images that are obtained. For example, if the user tilts his or her head right or left, the horizontal distance f in FIG. 11(a) between the user's eyes and an edge of a side of the user's face will change. In a similar manner, if the user tilts his or her head up or down, the vertical distance g between the user's eyes and an edge of the top of their head will change. Further, the shape or horizontal measurements a and b and the shape or vertical measurements e and h of the user's eyes will change and can change by different amounts. The separation distance c between the eyes can change as well. Using such information, the device can determine a type of motion that occurred and can use this information to help interpret the movement of the user's pupils or other such information.

Figure 12:
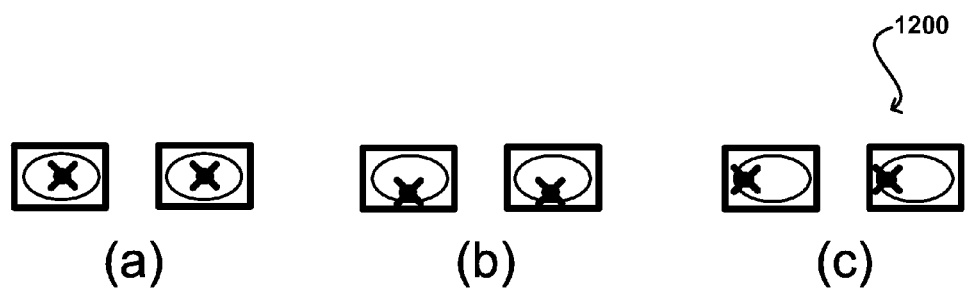
FIGS. 12(a)-(c) illustrate an example of capturing eye movement of a user as input in accordance with one embodiment.

For example, FIGS. 12(a)-12(c) illustrate the movement of a user's pupils with respect to the user's eye position. In some embodiments, the user's pupil position relative to the user's eye position can be at least partially indicative of the gaze direction of the user. For example, assuming the user is facing toward the device, in FIG. 12(a) the user is gazing forward, while in FIG. 12(b) the user is gazing downward and in FIG. 12(c) the user is gazing to the left (in the figure). Such information by itself, however, may not be sufficient to determine gaze direction. For example, if the user had tilted his or her head up (or back) while making the pupil movement in FIG. 12(b), the user might actually be looking forward (or even 'up' relative to the previous position). Further, if the user translates his or her head to the left or right in FIG. 12(a), but does not adjust the position of the pupils with respect to the user's eyes, then the viewing location would actually change even though the user is still looking straight ahead. Thus, in certain embodiments, it can be advantageous to utilize facial measurement approaches to interpret the pupil movements of FIGS. 12(a)-12(c).

When using an imaging element of the computing device to detect motion of the device and/or user, for example, the computing device can use the background in the images to determine movement. For example, if a user holds the device at a fixed orientation (e.g., distance, angle) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

In some embodiments, the accuracy of the image capture and detection can be such that gaze direction and/or field of view can be determined based substantially on pupil-related information. In one embodiment, image analysis can be performed to locate the position of the user's pupils. The dimensions of the pupils themselves, as well as position and separation, can be indicative of changes in the user's gazing direction. For example, in addition to determining that pupils move from left to right in adjacently-captured images, the device can determine, due to small changes in the width of each pupil, whether the user position with respect to the device has translated. Similarly, the device can determine whether the user rotated his or her eyes, which would result in changes in diameter since the eyes are spherical and changes in rotation will result in changes in the captured dimensions. By being able to precisely measure pupil-related dimensions, the device can track the field of view of the user with respect to the device.

Another benefit to being able to accurately measure pupil-related dimensions is that the device can also determine a focus depth of the user. For example, if the user focuses on a point "farther away" from the user, the device can detect a change in separation of the pupils. Because the device can also measure the dimensions of the pupils in the image, the device can also determine that the increase was not due to an action such as a decrease in the distance between the user and the device. Such information can be useful for three-dimensional images, for example, as the device can determine not only a viewing location, but also a depth at which the user is focusing in order to determine where the user is looking in three-dimensional space.

While user information such as pupil measurements can be determined through various image analysis approaches discussed above, conventional image analysis algorithms are relatively processor-intensive and can require a significant amount of memory. Conventional portable devices, such as cellular phones and portable media players, might not have the necessary resources to perform such real-time image analysis, particularly at the resolution needed to detect small variations in pupil diameter. Further, there must be a sufficient amount of ambient light in order for the image capture to work, such that if a user is reading an electronic book on a device with a display such as an electronic paper display, that does not generate significant illumination as would an LCD or similar display element, there might not be enough light to adequately capture the necessary image information.

An approach that can be used in accordance with various embodiments instead utilizes infrared (IR) radiation to illuminate at least a portion of the user and capture the reflected radiation. A particular advantage of IR radiation is that the human retina acts as a reflector with respect to IR, such that light from a given direction will reflect back in substantially the same direction but will not reflect back in a substantially different direction. This effect is similar to a red-eye effect in an image, where an image captured using a flash attached to the camera can experience the red-eye effect, but images captured from cameras at other angles with respect to the flash will not demonstrate the red-eye effect.

Using such an approach, a user can be illuminated with infrared radiation from the device, such as by including at least one infrared emitter in the device that will emit infrared radiation that is not harmful to the user and further cannot be detected by the user during use. The device can also include at least one infrared sensor for detecting infrared radiation reflected by the user. One advantage of such an approach is that the IR components can be relatively low-power, relative to illuminating a user with ambient light. Further, the images captured can have a relatively low color depth, similar to a grayscale image, such that much less processing capacity is needed than for analyzing full-color image analysis. In other embodiments, different techniques may be utilized to determine the gaze direction of a user.

Figure 13:
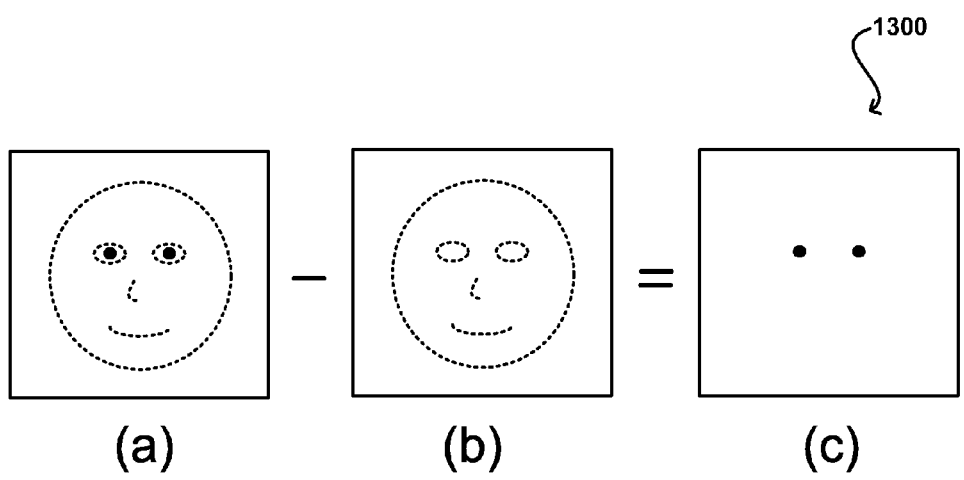
FIGS. 13(a)-(c) illustrate an approach to determining retina location from a pair of images that can be used in accordance with one embodiment.

FIGS. 13(a)-13(c) illustrate an example process for determining pupil or retina parameters using infrared radiation that can be used in accordance with various embodiments. In this example, a first image is shown in FIG. 13(a) that was captured using a sensor positioned near an infrared source, such that each retina reflects the infrared radiation. FIG. 13(b) illustrates another image captured using a sensor positioned away from an infrared source, such that any IR radiation reflected by the retinas is not directed to, or detected by, the sensor. Thus, as can be seen, the major significant difference between the two images is the reflection by the retinas. Using simple image comparison or subtraction algorithms, for example, the retinas can quickly be extracted from the images. If noise is sufficiently filtered out, using any appropriate method known in the art, the resultant image in FIG.

13(c) will include substantially only the reflection from the retinas, which can quickly be analyzed with very little resource allocation.

In order to accurately match the images, the images should be captured simultaneously or with little time between captures in order to minimize the effect of user and/or device movement. Further, in cases where there are two IR sensors positioned at different locations on the device, as is discussed elsewhere herein, image matching or rectifying algorithms can be used to adjust for offsets in the images due to the different capture positions. Various calibration or other such processes can be used as known in the art for matching the position of items captured from slightly different positions and/or angles.

As with the analysis of conventional full-color images described above, however, the resolution of the IR-based approach described above might not be sufficient to track gaze direction or field of view for all applications. In such cases, it can be beneficial to utilize additional input mechanisms and/or additional IR emitters and detectors to help interpret or enhance the captured information. At least some of these additional elements shall be referred to herein as "environment-determining input elements," as the additional elements are operable to determine at least one aspect relating to the environment surrounding the device, such as light or noise surrounding the device, a relative orientation of the device to the surroundings, whether a user is holding the device, etc. While use of IR emitters and detectors are described herein, any type of facial or movement recognition technique may be used with the embodiments described herein.

Figure 14:
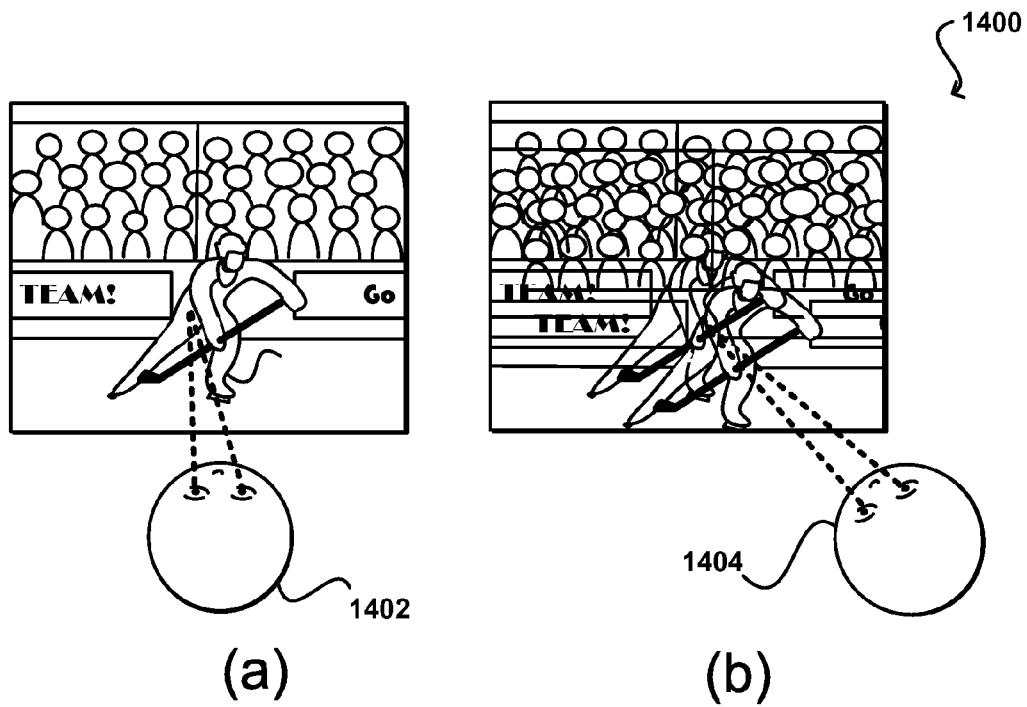
FIGS. 14(a)-(b) illustrate an example interface viewed by two viewers at different angles in accordance with one embodiment.

A number of other approaches can be used within the scope of the various embodiments to address the detection of additional viewers, intended or otherwise. For example, FIGS. 14(a)-(b) illustrate an example of an interface or display 1400 wherein the interface displays three-dimensional content. As known in the art, this can involve utilizing a special screen, film or other such component and providing two images rendered onto the display screen and/or additional component such that when the content is viewed from a direction substantially orthogonal to the screen, a viewer can see the rendered content in a quasi-three-dimensional representation. In FIG. 14(a), the primary user 1402 is viewing the display from a position substantially in front of the display, and thus can see the content rendered as intended. In some cases, the separation can change such that a primary user can view the three-dimensional content from any angle (within a range of angles), based upon a determined viewing angle of the user. In some embodiments, the content can be rendered such that viewers from other angles will not see the rendered images aligned on top of each other, but instead overlaid with a separation corresponding at least in part to the viewing angle of that viewer. For example, the viewer 1404 in FIG. 14(b) is viewing the device from an angle substantially different than orthogonal to the display, and thus sees a blurred image resulting from the improper combination of rendered images due to off-axis viewing.

In some embodiments, the content can otherwise be modified upon detection of an unintended viewer. For example, a portion of the characters in a body of text could be removed, flipped, rotated, animated or otherwise modified such that the unintended viewer cannot easily decipher what is displayed on the screen. The content can also be blurred, moved, spun, tilted or adjusted in any of a number of different ways to make it difficult for the unintended viewer to view the information.

Figure 15:
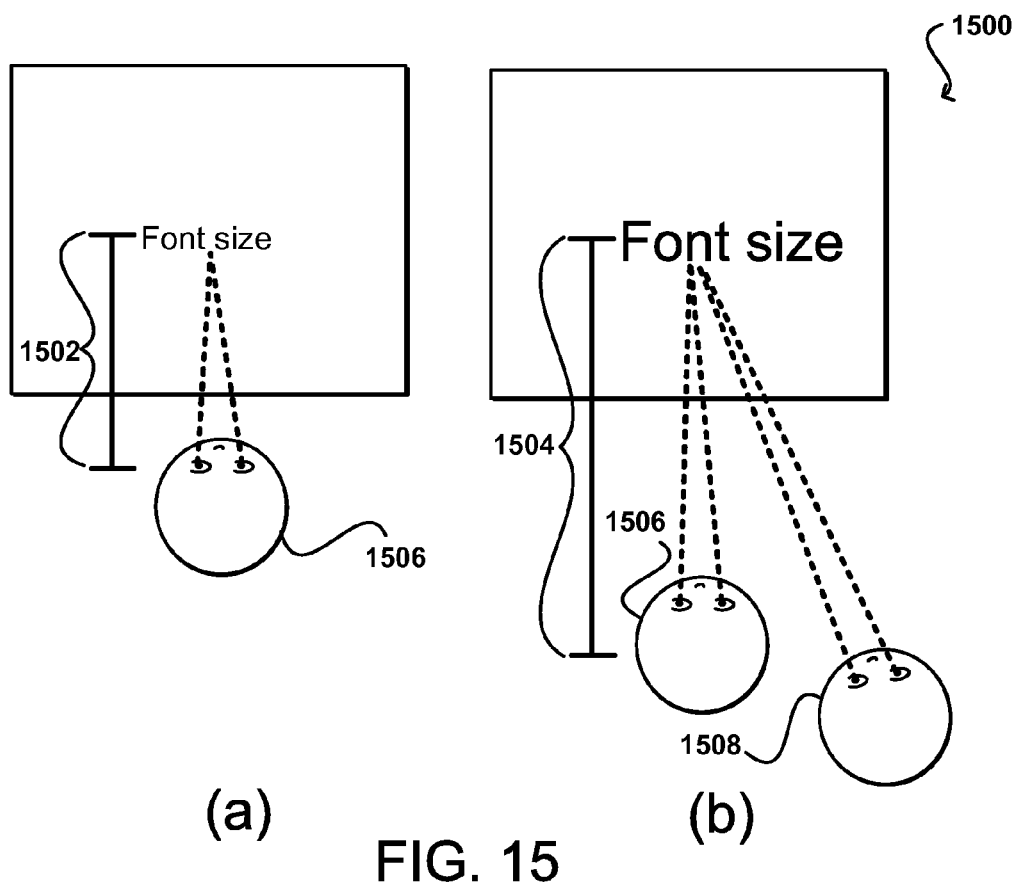
FIGS. 15(a)-(b) illustrate an example of a display that can adjust content rendering in accordance with one embodiment.

As discussed, however, there can be cases where secondary viewers might not be unintended viewers. For example, two or more people might want to watch video content displayed on an electronic device or interact together in a virtual game. In such a situation, the device might not alter content to prevent one or more viewers from accessing the content, but might instead alter the content to improve or enhance the ability of the viewers to view the content. In the example configuration 1500 of FIG. 15(a), a user 1506 viewing content a first distance 1502 from the display element might see content (e.g., text) rendered at a first size (e.g., font size). In FIG. 15(b), the user 1506 is further back from the screen, and the device might decide (based at least in part upon the increased distance) to render the content at a second size. Further, if a secondary viewer 1508 is detected to be viewing the display, the device might determine a new distance 1504 based on the detected viewers, such as an average distance, minimum distance or maximum distance of the viewers and can render the content at an appropriate size based on the determined distance. For content such as image or video content, the device in some embodiments can be configured to zoom the content based at least in part upon the distance to the viewers. In some embodiments, documents or other instances of content can open at a particular size (e.g., at 100% or zoomed in or out accordingly) based at least in part upon the determined distance of one or more viewers, as well as other information such as user identity and/or preferences. Similar adjustments (e.g., brightness and contrast) can be made as well for other embodiments.

In the example of an interactive game, the device may determine the number of viewers looking at the device and initiate the game such that each viewer is included. For example, if the device detects a primary viewer and three secondary viewers at the time a game is launched, the device will initiate the game with four players enabled and allow each user to interact and play the game based on their tracked gaze direction. In such an embodiment, the device tracks gaze direction for each user and controls each viewer's interaction with the game based on the determined gaze direction.

Figure 16:
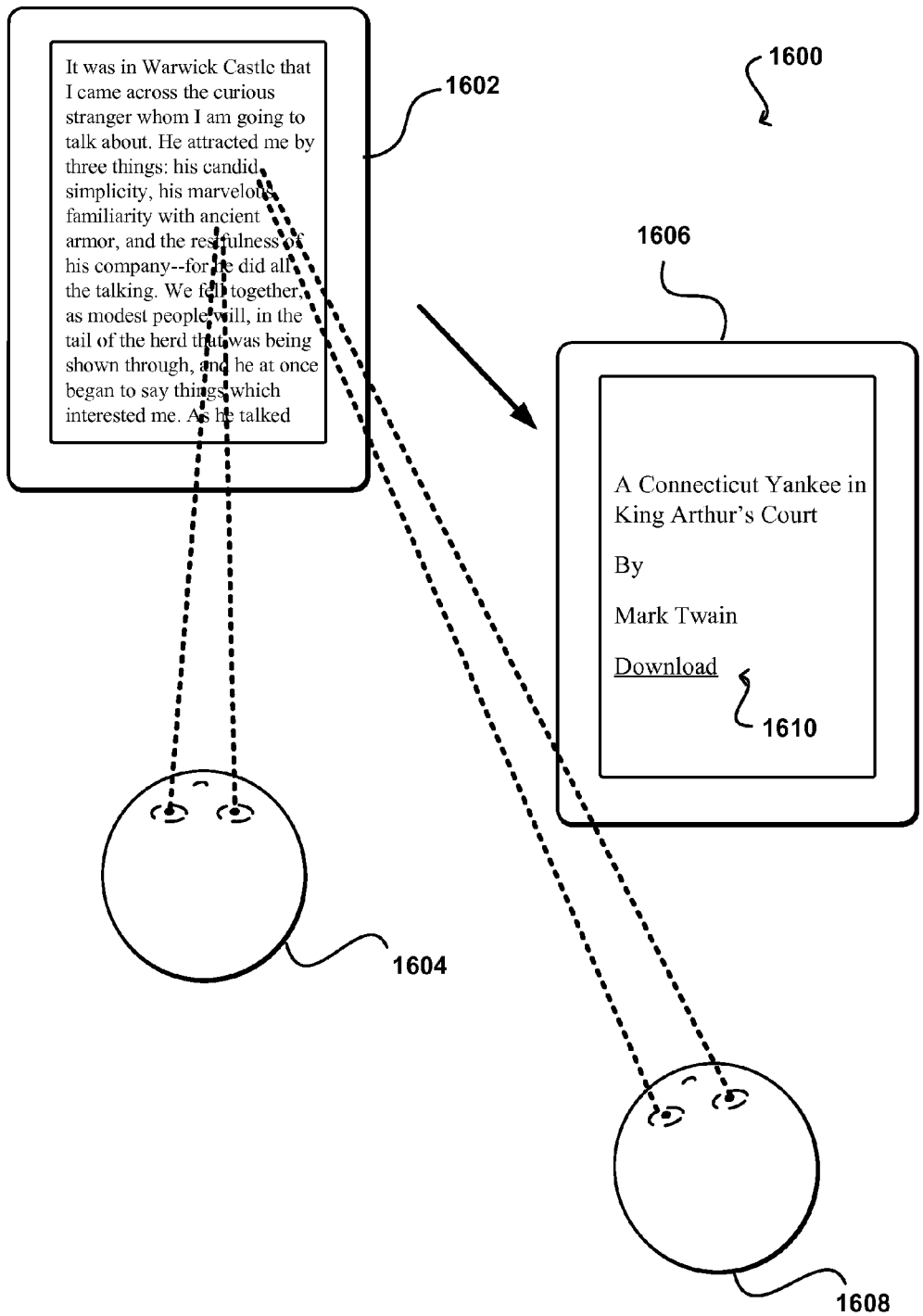
FIG. 16 illustrates an example process for sharing content information among users based at least in part upon gaze direction in accordance with one embodiment.

In some embodiments, a computing device 1602 of a primary user 1604 might also be able to detect another device 1606 associated with a secondary viewer 1608, as illustrated in the configuration 1600 of FIG. 16. For example, an imaging element might be able to detect an aspect of the device (e.g., via image recognition) that enables the computing device 1602 to identify the other device. In one embodiment, the secondary device 1606 has an identification tag/label attached that includes a bar code or other identifier that can be detected by the computing device 1602. In other embodiments, the computing device might be able to recognize the secondary viewer (e.g., by RF, radio, facial recognition) and might have access (either locally or remotely) to identifying information for the secondary device 1606 associated with the secondary viewer 1608. In some cases, the secondary viewer might provide the primary user with the identifying information for the secondary device 1606. Other approaches for identifying the device can be used as well.

If the computing device 1602 can identify and communicate with the secondary device 1606, the computing information can share information based at least in part upon the detected gaze direction of the secondary user 1608. In this example, the primary user is reading an electronic book on the computing device. If the computing device detects the secondary viewer reading the text, or otherwise viewing at the display screen, the computing device can send information to the secondary device 1606 identifying the content and/or providing related information. For example, the secondary device in this example displays to the secondary viewer a title and author of the book that the primary user 1604 is reading on the primary device 1602 and provides a link 1610 or other source for obtaining a copy of that content. Such an approach can allow the secondary viewer 1608 to easily identify and obtain content that might be of interest to that viewer. Further, such an approach can help a provider of the content to enforce licensing or agreement terms and/or to be able to provide content to potential customers. In alternative embodiments, such as when access to a remote location is not available (e.g., on an airplane), the primary device 1602 may provide the actual content to the secondary device 1606.

An approach in accordance with another embodiment enables a user of a computing device to selectively prevent secondary viewers from viewing content rendered on the device. As illustrated in the example configuration 1700 of FIG. 17(*a*), a primary user 1704 and a secondary viewer 1706 can view information displayed on a display element 1702 of a computing device. Such a situation might be acceptable where the user does not care whether the secondary viewer views the displayed content. In some cases, however, the user might want to prevent the secondary viewer from viewing the content.

Conventional approaches to preventing an unintended viewer from viewing content from certain angles involve placing a polarizing film over a display element. Such an approach may not be optimal, however, as there might be times in which the user wants content to be viewable from different angles, such as when friends are viewing gaming or video content. In such an example, the user would have to apply and take off the film or screen each time the user wanted to allow or prevent off-angle viewing.

An approach in accordance with at least one embodiment enables a computing device to activate or deactivate such off-axis viewing capability by providing the ability to activate a polarizing element of the computing device. In some embodiments, this can include a separate element or film wherein the polarizing pattern can be activated by applying an appropriate electrical signal. In other embodiments, the polarization pattern can be rendered as part of the display itself, such as a series of very small parallel lines that are virtually invisible when viewed from an angle substantially orthogonal to the screen but will prevent the content from being viewed from other angles. In some embodiments the device includes a film on the screen to be used in combination with the display, such that one element can act as a birefringent filter and the other element can act as a polarizing element. Various other combinations can be used as well within the scope of the various embodiments.

Figure 17:
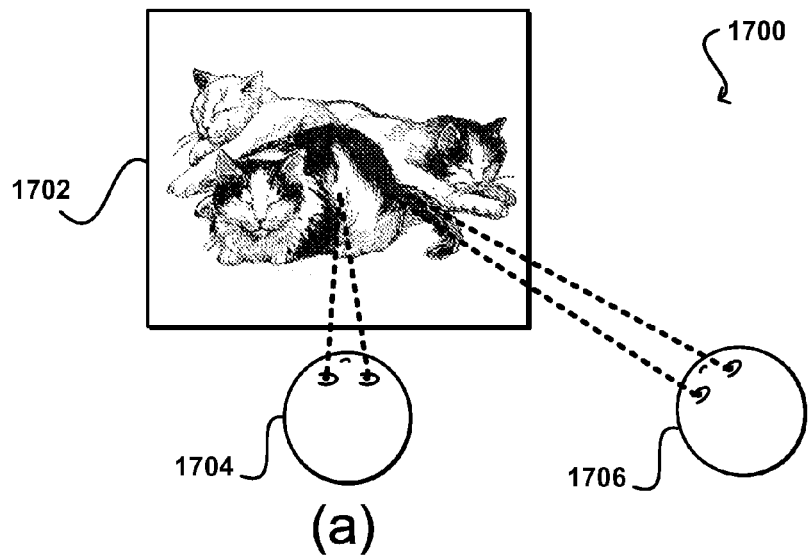
FIGS. 17(a)-(d) illustrate an example interface including a selective polarization element that can be used in accordance with one embodiment.
Figure 17:
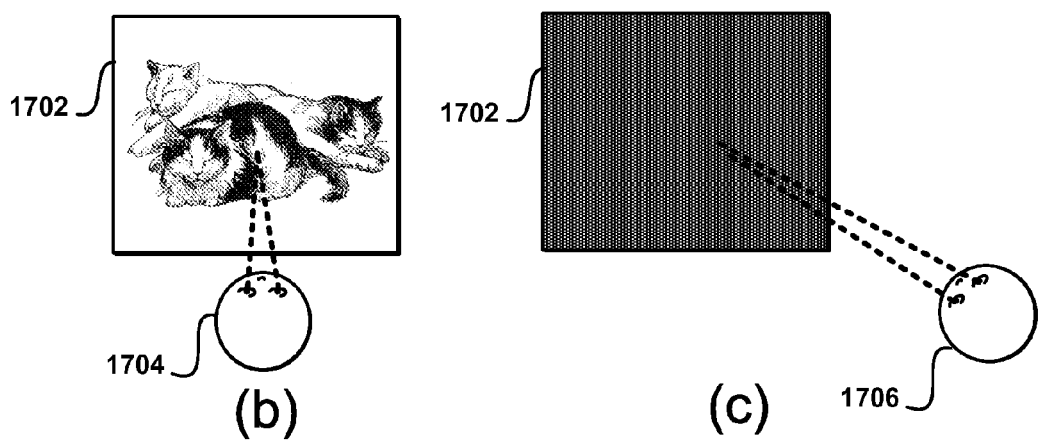
Figure 17:
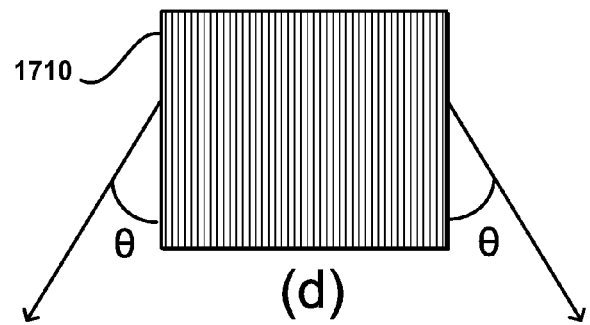

FIG. 17(*b*) illustrates the orthogonal view of the display 1702 as seen by the primary user 1704, and FIG. 17(*c*) illustrates an example off-axis view of the display as seen by a secondary viewer 1706. As can be seen, the polarizing pattern prevents the secondary viewer from viewing the content on the display. FIG. 17(*d*) illustrates a simplified example of a pattern 1710 that can be displayed to provide the polarization and an associated range of angles (θ) over which the content can be viewed. In some embodiments, the determined viewing angle of the secondary viewer can cause the device to change the rendered polarization pattern, such as to adjust the period of the pattern, in order to ensure that the viewer cannot see the content from a specific angle.

Figure 18:
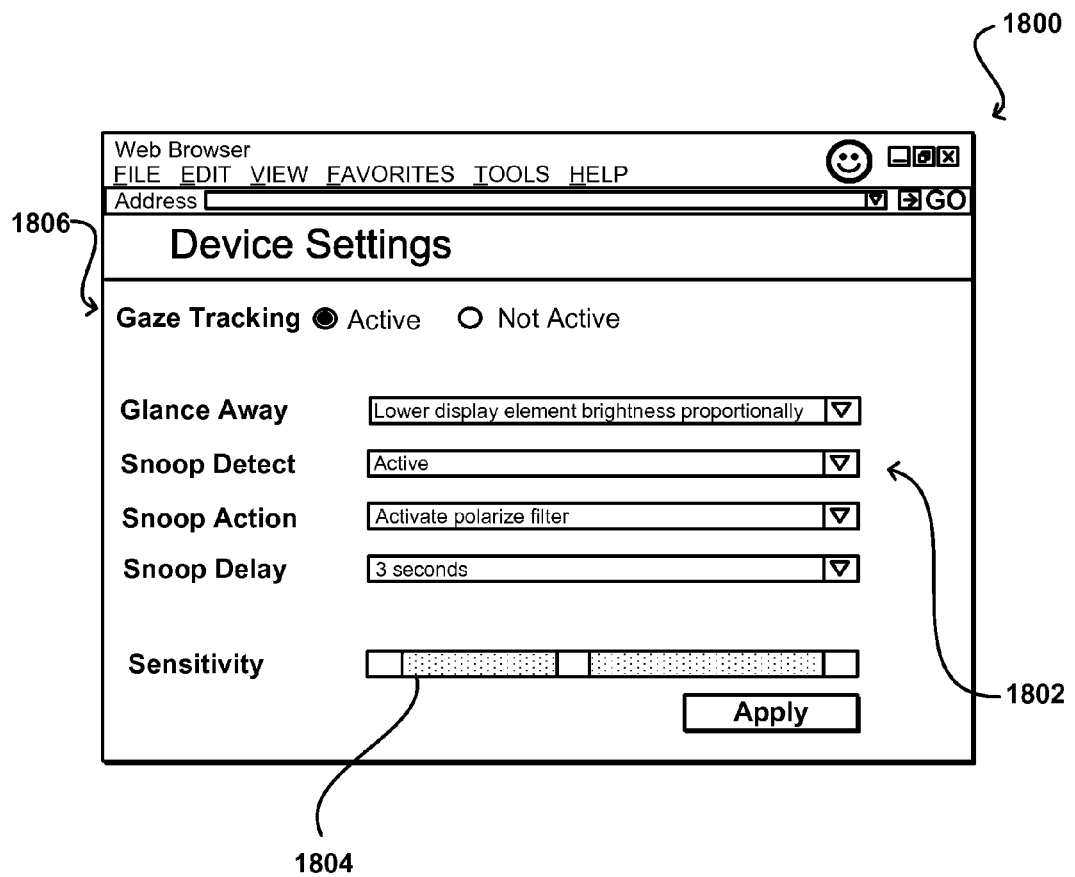
FIG. 18 illustrates an example interface enabling a user to configure aspects of gaze detection in accordance with one embodiment.

In some embodiments, at least some of the functionality described herein can be at least partially configurable by a user of the device. For example, FIG. 18 illustrates an example of a configuration display 1800 that could be displayed to a user of the computing device. In this example, the user is able to enable/disable functions, such as gaze-based viewer tracking 1806. For example, the user can be presented with several options for each of a number of situations 1802. In this example, the user has selected that the display element brightness should lower when an unintended viewer is detected. There can be any of a number of actions for each situation and any of a number of different situations specified. There can be other inputs as well, such as a sensitivity adjustment 1804 that can adjust how quickly the device reacts or the thresholds used to control device actions. In one embodiment, a highly sensitive setting can cause the device display element to shut off as soon as an unintended viewer is determined to be looking at the display element, while a low sensitivity setting might cause the device to lower brightness of the display element, or power off, only when the viewer looks at the display for a certain amount of time, etc.

In some embodiments, the device also can prevent a user from performing certain activities when a secondary viewer is detected. For example, if the computing device is an automated teller machine ("ATM") or similar device allowing financial information to be input and/or displayed, the device might lock out certain functionality (such as entering a PIN number) when another person is determined to be viewing in the direction of the display screen and/or an input portion of the device. Similar functionality can be used on any device when a user attempts to enter certain information, such as a social security number or date of birth. In other cases, the device might allow the user to enter the information, but will mask or otherwise distort the information displayed on the device when a secondary user is detected.

In addition to controlling the ways in which users and/or viewers interact with specific computing devices, the ability to detect viewers of content on a computing device can be advantageous for other situations as well. For example, a computing or display device (or a system in communication with the device) can track the number of viewers of a piece of content, as well as when the viewers were looking at the content, where the users were looking, how long the average viewer viewed the content and other such information. This information can be useful to entities such as advertisers and other content providers, who would like to be able to more accurately determine the number of users viewing particular content, as well as how those users viewed the content (e.g., keeping their eyes on the content, glancing up periodically). Advertisers can track how well different commercials or advertisements perform at different times, or associated with different content, based at least in part upon the number of viewers that actually looked at the advertising. Content providers can also collect information for purposes of ratings, demographic tracking and other such purposes. If the provider charges for the content, the provider can charge based on the number of viewers, such that a large number of viewers might pay a higher price, and a single viewer might pay less than would otherwise be required (e.g., where the content provider based pricing on an average number of users).

For applications such as classrooms, continuing education, traffic school or other such applications where attention to specific content is required, the computing device can track how much time each user spent looking at, or away from, the screen. In some cases, a user must gaze at the screen a minimum amount of time in order to receive credit for the viewing. In a testing situation, the devices can track when users view other users' tests, and in some cases can blank the screen or lock out functionality when potential cheating is detected. If facial recognition is used, the device can ensure that only the intended user views the display.

Figure 19:
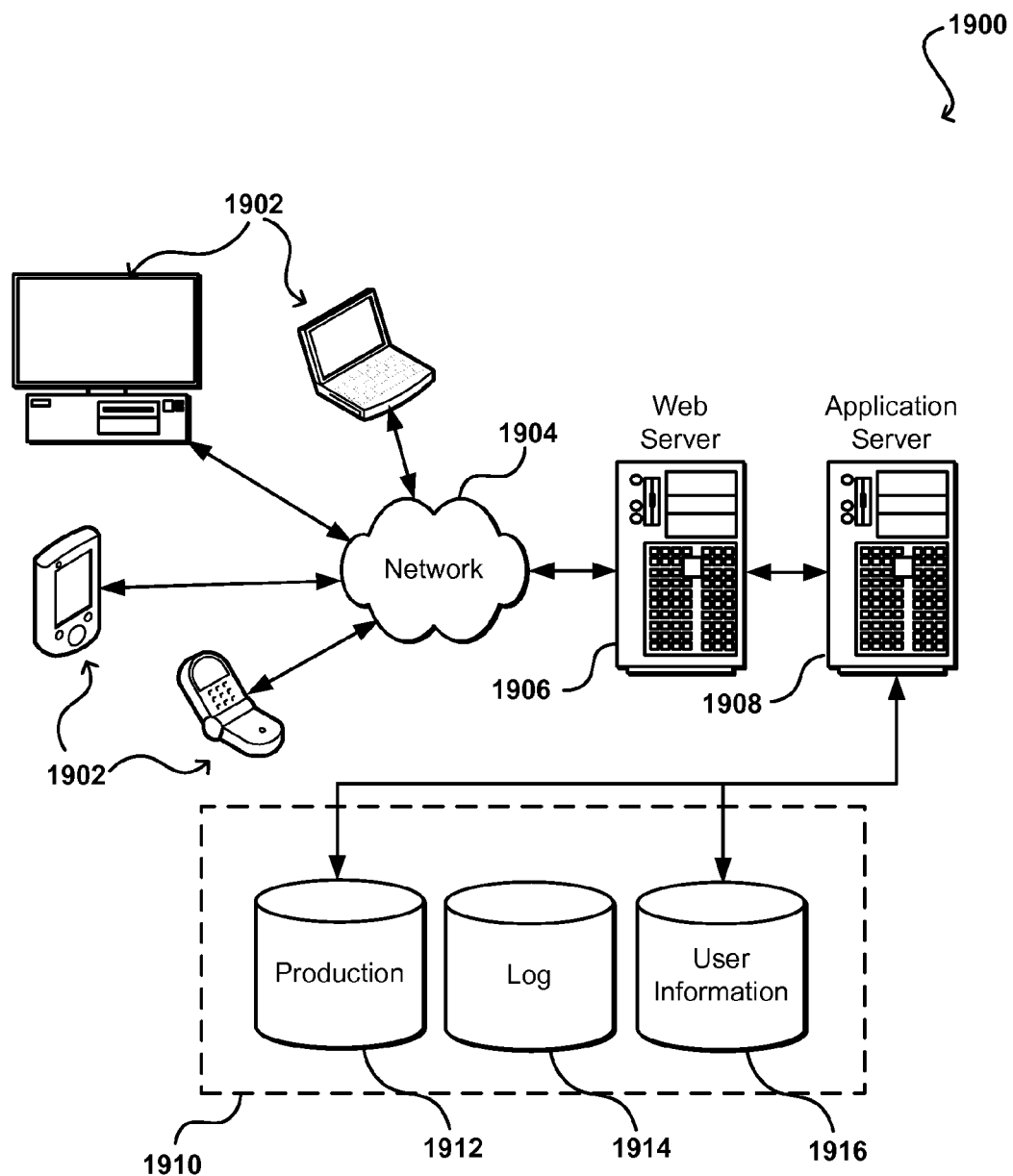
FIG. 19 illustrates an environment in which various embodiments can be implemented.

As discussed, different approaches can be implemented in various environments in accordance with the described embodiments. For example, FIG. 19 illustrates an example of an environment 1900 for implementing aspects in accordance with various embodiments. As will be appreciated, although a Web-based environment is used for purposes of explanation, different environments may be used, as appropriate, to implement various embodiments. The system includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1906 for receiving requests and serving content in response thereto, although for other networks an alternative device serving a similar purpose could be used, as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1902 and the application server 1908, can be handled by the Web server 1906. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing production data 1912 and user information 1916, which can be used to serve content for the production side. The data store also is shown to include a mechanism for storing log or session data 1914. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
    obtaining an image using an imaging element of a computing device, the imaging element positioned with respect to the computing device such that one or more viewers viewing a display element of the computing device appear in at least a portion of the obtained image;
    analyzing the obtained image, using the computing device, to identify an unauthorized viewer in the obtained image;
    determining a position of the unauthorized viewer to be substantially toward at least a portion of the computing device;
    identifying a device associated with the unauthorized viewer; and
    generating a notification to be communicated to the identified device associated with the unauthorized viewer, the notification including an advertisement associated with content displayed on the computing device.

2. The method of claim 1, wherein the position of the unauthorized viewer is determined based at least in part on a gaze direction of the unauthorized viewer.

3. The method of claim 1, wherein the position of the unauthorized viewer is determined based at least in part on tracking, using the imaging element, at least a portion of a body of the unauthorized viewer.

4. The method of claim 1, wherein the notification further includes a warning to the unauthorized viewer.

5. The method of claim 1, further comprising:
    determining a privacy mode of the computing device in response to determining the position of the unauthorized viewer to be substantially toward at least a portion of the computing device; and
    performing at least one privacy action associated with the computing device, the privacy action being determined based at least in part on the determined privacy mode.

6. The method according to claim 5, wherein the at least one privacy action includes at least one of dimming the display element, turning off the display element, limiting a viewable angle of the display element, obstructing content displayed on the display element, or notifying an authorized viewer.

7. A computing device, comprising:
    a processor;
    at least one imaging element;
    a display element for displaying content; and
    a memory device including instructions operable to be executed by the processor to perform a set of actions, enabling the processor to:
    obtain an image using the at least one imaging element;
    analyze the obtained image, using the computing device, to identify an unauthorized viewer in the obtained image;
    determine a position of the unauthorized viewer to be substantially toward at least a portion of the computing device;
    identify a device associated with the unauthorized viewer; and
    generate a notification to be communicated to the identified device associated with the unauthorized viewer, the notification including an advertisement associated with content displayed on the computing device.

8. The computing device of claim 7, wherein the position of the unauthorized viewer further is determined based at least in part on tracking, using the at least one imaging element, at least a portion of a body of the unauthorized viewer.

9. The computing device of claim 7, wherein the notification further includes a warning to the unauthorized viewer.

10. The computing device of claim 7, further including instructions operable to be executed by the processor to perform a set of actions, enabling the processor to:
determine a privacy mode of the computing device, wherein content of the notification is generated based at least in part on the determined privacy mode.

11. The computing device of claim 7, further including instructions operable to be executed by the processor to perform a set of actions, enabling the processor to:
determine a privacy mode of the computing device; and
perform at least one privacy action on the computing device based at least in part on the determined privacy mode.

12. The computing device of claim 11, wherein the privacy mode of the computing device is based at least in part on input that specifies one or more privacy actions to be performed by the computing device corresponding to a plurality of situations.

13. The computing device of claim 11, wherein the privacy mode of the computing device is determined based at least in part on an environment in which the computing device is located.

14. The computing device of claim 11, wherein the privacy mode of the computing device is determined based at least in part on content displayed on the computing device.

15. The computing device according to claim 11, wherein the at least one privacy action includes at least one of dimming the display element, turning off the display element, limiting a viewable angle of the display element, obstructing the content displayed on the display element, and notifying an authorized viewer.

16. A non-transitory computer-readable storage medium storing processor-executable instructions for controlling a computing device, comprising:
program code for obtaining an image using at least one imaging element;
program code for analyzing the obtained image, using the computing device, to identify an unauthorized viewer in the obtained image;
program code for determining a position of the unauthorized viewer to be substantially toward at least a portion of the computing device;
program code for identifying a device associated with the unauthorized viewer; and
program code for generating a notification to be communicated to the identified device associated with the unauthorized viewer, the notification including an advertisement associated with content displayed on the computing device.

17. The non-transitory computer-readable storage medium of claim 16, further comprising:
program code for determining a privacy mode of the computing; and
program code for performing at least one privacy action based at least in part on the privacy mode of the computing device.

18. The non-transitory computer-readable storage medium of claim 17, wherein the at least one privacy action includes at least one of dimming a display element, turning off the display element, limiting a viewable angle of the display element, obstructing the content displayed on the display element, and notifying a primary viewer.

19. The non-transitory computer-readable storage medium of claim 16, wherein the privacy mode of the computing device is determined based at least in part on an environment in which the computing device is located.

20. The non-transitory computer-readable storage medium of claim 16, wherein determining a position of the unauthorized viewer further comprising:
tracking, using the at least one imaging element, at least a portion of a body of the unauthorized viewer.

* * * * *